US008983772B2

(12) United States Patent
Lee

(10) Patent No.: US 8,983,772 B2
(45) Date of Patent: Mar. 17, 2015

(54) METHOD FOR DISPLAYING NAVIGATION ROUTE, NAVIGATION APPARATUS AND RECORDING MEDIUM

(75) Inventor: Yu-Cheng Lee, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 462 days.

(21) Appl. No.: 12/831,272

(22) Filed: Jul. 7, 2010

(65) Prior Publication Data

US 2011/0022300 A1 Jan. 27, 2011

Related U.S. Application Data

(60) Provisional application No. 61/228,957, filed on Jul. 27, 2009.

(30) Foreign Application Priority Data

Dec. 18, 2009 (TW) ............................... 98143716 A

(51) Int. Cl.
G01C 21/34 (2006.01)
G01C 21/36 (2006.01)

(52) U.S. Cl.
CPC ........ *G01C 21/3632* (2013.01); *G01C 21/3676* (2013.01)
USPC ....................................................... 701/431

(58) Field of Classification Search
CPC .................... G01C 21/3415; G08G 1/096844; G08G 1/096827
USPC .................................................. 701/200, 455
See application file for complete search history.

(56) References Cited

U.S. PATENT DOCUMENTS

| 6,333,702 | B1 | 12/2001 | Hiyokawa et al. |
| 8,086,402 | B2 * | 12/2011 | Kindo et al. ............. 340/995.15 |
| 2003/0069689 | A1 * | 4/2003 | Ihara et al. ..................... 701/208 |
| 2003/0132862 | A1 | 7/2003 | Kurosawa |
| 2006/0074553 | A1 * | 4/2006 | Foo et al. ...................... 701/212 |

(Continued)

FOREIGN PATENT DOCUMENTS

| CN | 1760931 | 4/2006 |
| CN | 101311983 | 11/2008 |

(Continued)

OTHER PUBLICATIONS

"First Office Action of China Counterpart Application", issued on Dec. 7, 2011, p. 1-p. 8.

(Continued)

*Primary Examiner* — Mark Holcomb
*Assistant Examiner* — Jonathan K Ng
(74) *Attorney, Agent, or Firm* — Jianq Chyun IP Office

(57) ABSTRACT

A method for displaying a navigation route, a navigation apparatus, and a recording medium are provided. In the method, a current location of a mobile device is detected. Next, a start point and an end point are received and a navigation route is planned accordingly. Then, an electronic map database is accessed and a navigation map is rendered on a screen of the mobile device according to the electronic map database, wherein only the map information associated with the navigation route in the electronic map database is displayed on the navigation map and the displayed map information comprises the road names of a current road and a next road associated with the current location of the mobile device in the navigation route.

13 Claims, 7 Drawing Sheets

(56) References Cited

U.S. PATENT DOCUMENTS

| | | | | |
|---|---|---|---|---|
| 2006/0089798 | A1* | 4/2006 | Kaufman et al. | 701/211 |
| 2007/0005233 | A1* | 1/2007 | Pinkus et al. | 701/200 |
| 2007/0005241 | A1* | 1/2007 | Sumizawa et al. | 701/211 |
| 2008/0140312 | A1* | 6/2008 | Shimizu | 701/209 |

FOREIGN PATENT DOCUMENTS

| | | |
|---|---|---|
| CN | 101344397 | 1/2009 |
| DE | 3918668 | 12/1990 |
| EP | 0777206 | 6/1997 |
| EP | 0779498 | 6/1997 |
| EP | 1643214 | 4/2006 |
| JP | 2000292180 | 10/2000 |
| TW | 200725499 | 7/2007 |
| TW | 200831857 | 8/2008 |

OTHER PUBLICATIONS

"Search Report of European counterpart application", issued on Oct. 28, 2010, p. 1-p. 8.

"Second Office Action of China Counterpart Application", issued on Dec. 4, 2012, p. 1-p. 9.

"Office Action of Taiwan Counterpart Application", issued on Jan. 29, 2013, p. 1-p. 10.

"Office Action of Europe Counterpart Application", issued on Apr. 16, 2012, p. 1-p. 7.

* cited by examiner

METHOD FOR DISPLAYING NAVIGATION ROUTE, NAVIGATION APPARATUS AND RECORDING MEDIUM

CROSS-REFERENCE TO RELATED APPLICATION

This application claims the priority benefit of U.S. provisional application Ser. No. 61/228,957, filed on Jul. 27, 2009 and Taiwan application serial no. 98143716, filed on Dec. 18, 2009. The entirety of each of the above-mentioned patent applications is hereby incorporated by reference herein and made a part of specification.

BACKGROUND OF THE INVENTION

The conventional navigation apparatus has a built-in smart electronic map and can execute functions of route planning and navigation. The user is only required to input a name or a coordinate of a destination to be leave for, or directly select a particular location on the electronic map, and then the navigation apparatus plans a navigation route based on the detected location and a geographical location of the destination input by the user, and delivers a voice message to guide the user to the destination along the planned navigation route.

However, in order to provide users with detailed map information, ordinary electronic map is usually mixed with complex contents. Besides basic marks such as line map, road name of each road, all points of interest (POI) in the frame such as gas station, convenience store, restaurant and viewpoint, and building, if further accompanied with function icons and keys such as compass, scale, volume, start and end point setting, 2D/3D switch, the whole screen is almost filled up. Accordingly, when performing the navigation function in practice, the navigation route always mixes up with those marks icons, and keys, which effects the user's judgments on the navigation route. As a result, the user may look at wrong marks or get lost in the route with slight carelessness, which results in circumstances such as driving to a wrong lane or missing the timing for making a turn.

SUMMARY

The application is directed to a method for displaying a navigation route, which displays necessary map information associated with the navigation route, thus offering clearer route guidance to the users.

The application is also directed to a navigation apparatus, which only displays road names of a current road and a next road in a navigation route, and displays a reference point on a turning point, so as to prevent the navigation route from being interfered or covered by other map information.

The application provides a method for displaying a navigation map, suitable for a mobile device having a screen. In the method, a current location of the mobile device is detected. A start point and an end point are received, and then a navigation route is planned accordingly. Thereafter, an electronic map database is accessed and a navigation map is rendered on the screen according to the electronic map database, wherein only the map information associated with the navigation route in the electronic map database is displayed on the navigation map, wherein the displayed map information comprises the road names associated with a current road and a next road in the navigation route corresponding to the current location.

In one example of the present application, the step of rendering the navigation map further comprises displaying a reference point on a turning point of the current road turning to the next road in the navigation map, in which the reference point comprises a point of interest (POI), a landmark, a store or a building located in the turning point.

In one example of the present application, the step of rendering the navigation map on the screen further comprises displaying a representative icon of the mobile device on a current location of the mobile device in the navigation map. The representative icon comprises a speed and forward direction information of the mobile device, and a speed limit of the current road where the mobile device is located.

In one example of the present application, the step of rendering the navigation map on the screen further comprises marking a distance between the current location of the mobile device and a location of a next turning point in the navigation route.

In one example of the present application, the step of rendering the navigation map on the screen further comprises displaying a thumbnail of the navigation route on the screen, wherein the thumbnail comprises a start point, an end point, and a path of the navigation route, and comprises a mark indicating the current location of the mobile device on the navigation route, receiving an operation of a user for the thumbnail and activating a route simulation mode accordingly, in which a representative icon of the mobile device is moved on the navigation route to simulate the navigation route.

In one example of the present application, the step of rendering the navigation map on the screen comprises rendering the navigation map in a form of a two-dimensional plan view or a three-dimensional bird eye view. The display scale of the three-dimensional bird eye view is larger than that of the two-dimensional plan view.

The application provides a navigation apparatus comprising a positioning unit, an input unit, a display unit, a storage unit, and a processing unit. The positioning unit is used for detecting a current location of the navigation apparatus. The input unit is used for receiving a start point and an end point. The storage unit is used for storing an electronic map database. The processing unit is coupled to the positioning unit, the input unit, the display unit and the storage unit, and used for planning a navigation route according to the start point and the end point received by the input unit, accessing the electronic map database stored in the storage unit, and rendering a navigation map on the display unit according to the electronic map database, wherein only map information in the electronic map database associated with the navigation route is displayed, wherein the displayed map information comprises road names associated with a current road and a next road in the navigation route corresponding to the current location of the mobile device in the navigation route.

The present application further provides a recording medium which records a computer program to be loaded into a mobile device to execute following steps. A current location of the mobile device is detected. A start point and an end point are received, and then a navigation route is planned accordingly. An electronic map database is accessed and a navigation map is rendered on the screen according to the electronic map database, wherein only the map information associated with the navigation route in the electronic map database is displayed on the navigation map, wherein the displayed map information comprises the road names associated with a current road and a next road in the navigation route corresponding to the current location of the mobile device.

Based on the above, the method for displaying the navigation route, the navigation apparatus and the recording medium of the application only display map information associated with the navigation route, in which only the necessary information, for example the road names of a current road and a next road associated with the current location the mobile device and a reference point located in a turning point are displayed, so as to prevent the navigation route from being mixed with other information on the map.

In order to make the aforementioned and other features and advantages of the application more comprehensible, examples accompanying figures are described in detail below.

BRIEF DESCRIPTION OF THE DRAWINGS

The accompanying drawings are included to provide a further understanding of the application, and are incorporated in and constitute a part of this specification. The drawings illustrate examples of the application and, together with the description, serve to explain the principles of the application.

DESCRIPTION OF EXAMPLES

The application only access map information associated with the navigation route in the electronic map database, so as to provide a simplified, but still containing necessary information, navigation map, which can help users to focus on the navigation route and go to the destination properly.

Figure 1:
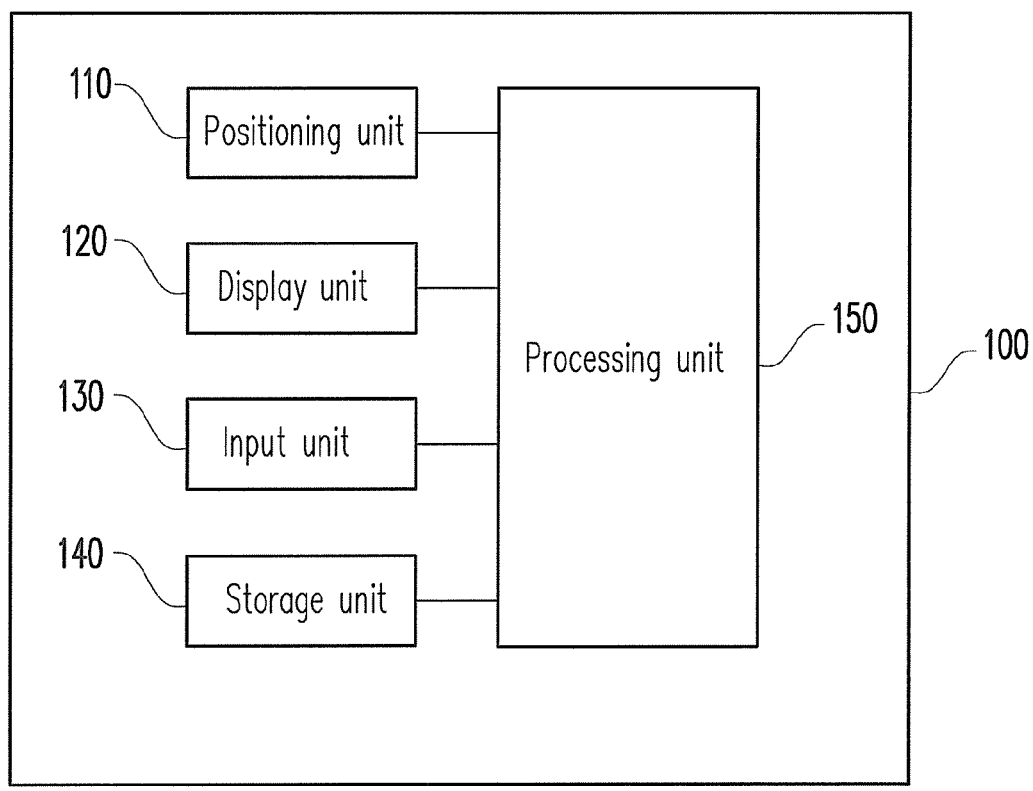
FIG. 1 is a block diagram of a navigation apparatus according to an example of the present application.

FIG. 1 is a block diagram of a navigation apparatus according to an example of the present application. Referring to FIG. 1, the navigation apparatus 100 comprises a positioning unit 110, a display unit 120, an input unit 130, a storage unit 140, and a processing unit 150, and is able to provide concise map information for guiding the users to the destination. The navigation apparatus 100 is, for example, a mobile phone, a smartphone, a personal digital assistant (PDA), a PDA phone, a car PC, a notebook, a multimedia player, or a handheld gamer, etc. The functions of aforesaid elements are respectively described as follows.

The positioning unit 110 is used for obtaining a current location of the navigation apparatus 100, and is, for example, a global positioning system (GPS), or other positioning systems using a global system for mobile communication (GSM) system, a personal handy-phone system (PHS), a code division multiple access (CDMA) system, a wireless fidelity (Wi-Fi) system, a worldwide interoperability for microwave access (WiMAX) system, a radio repeater, or a radio broadcaster for performing positioning, which is not limited by the present example.

The display unit 120 is, for example, a liquid crystal display (LCD), a light emitting diode (LED) display, an organic light emitting diode (OLED) display, a field emission display (FED), and/or other displays suitable for displaying a navigation map.

The input unit 130 is, for example, a mouse, a keyboard, a joystick, or a touch pad, and is used for receiving an operation of a user for planning a navigation route. Further, the input unit 130 may also be, for example, a resistive type, a capacitive type, or other types of touch sensitive units, and is able to be integrated with the display unit 120 to form a touch screen.

The storage unit 140 is, for example, any one of a fixed or non-fixed random access memory (RAM), a read-only memory (ROM), a flash memory, a hard disk, or other similar devices or a combination of those devices, and is used for storing an electronic map database.

The processing unit 150 is, for example, a central processing unit (CPU), or other programmable ordinarily-used or specifically-used microprocessor, digital signal processor (DSP), programmable controller, application specific integrated circuit (ASIC), programmable logic device (PLD), or other similar devices or a combination of those devices.

The processing unit 150 is coupled to the positioning unit 110, the display unit 120, the input unit 130 and the storage unit 140, and is able to plan a navigation route according to a start point and an end point received by the input unit 130 and display the same on the display unit 120. Examples are given below for illustrating detailed steps of the navigation apparatus 100 displaying the navigation route.

Figure 2:
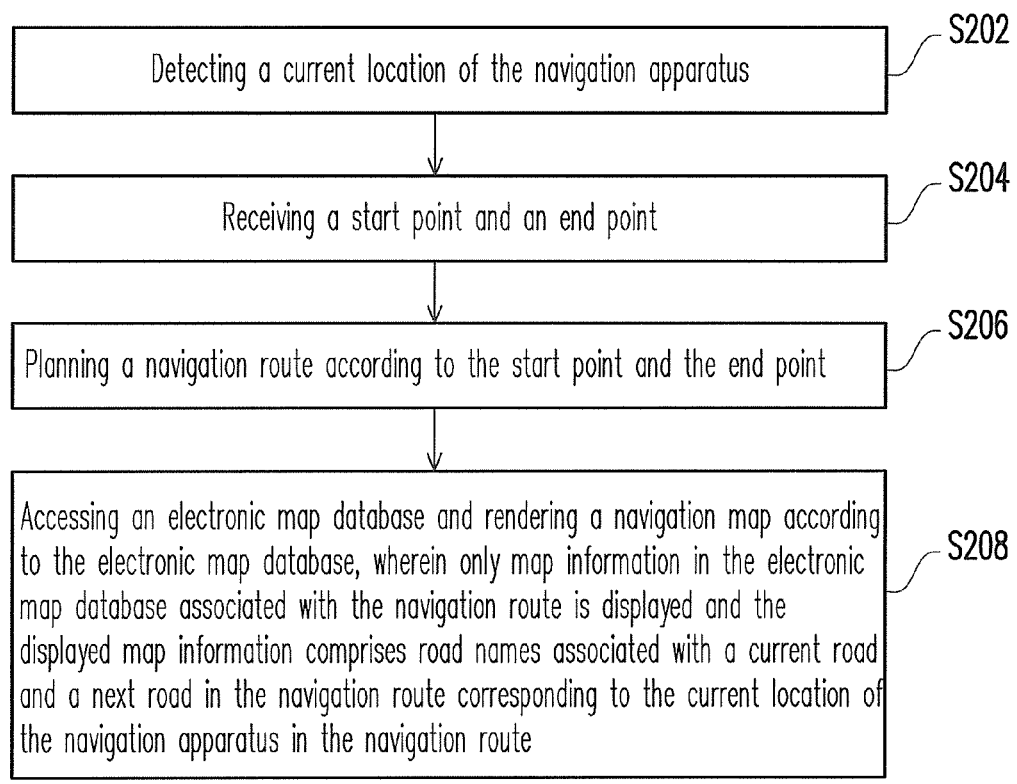
FIG. 2 is a flowchart illustrating a method for displaying a navigation route according to an example of the present application.

FIG. 2 is a flowchart illustrating a method for displaying a navigation route according to an example of the present application. Referring to FIG. 2, the method of the example is suitable for the navigation apparatus 100 in FIG. 1 and detailed steps of the navigation route display method of the application are described in detail below with reference to the aforesaid elements of the navigation apparatus 100.

First, the navigation apparatus 100 detects a current location itself by the positioning unit 110 (step S202), receives a start point and an end point by the input unit 130 (step S204), and then plans a navigation route by the processing unit 150 according to the start point and the end point received by the input unit 130 (step S206). Wherein, the start point received by the input unit 130 is, for example, the current location of the navigation apparatus 100 detected by the positioning unit 110, a coordinate or an address entered by the user, or a POI (Point of Interest) selected from a POI list by the user. The end point is, for example, a coordinate or an address entered by the user, or a POI selected from a POI list by the user, which is not limited herein.

Next, when the navigation apparatus 100 is about to display the navigation route, the processing unit 150 accesses the electronic map database stored in the storage unit 140 and renders a navigation map on the display unit 120 according to the data in the electronic map database, in which only the map information in the electronic map database associated with the navigation route is displayed, wherein the displayed information comprises the road names associated with a current road and a next road in the navigation route corresponding to the current location of the navigation apparatus in the navigation route (step S208). Further, the navigation apparatus 100 displays the navigation map in a form of a two-dimensional plan view or a three-dimensional bird eye view, which is not limited herein. The navigation apparatus 100 may enable the user to switch between the two-dimensional plan view and the three-dimensional bird eye view. Furthermore, in the meantime of switching, the navigation apparatus 100 may display the two-dimensional plan view and the three-dimensional bird eye view in different display scales. For example, when the user switches from the two-dimensional plan view to the three-dimensional bird eye view, the navigation apparatus 100 magnifies the display scale of the three-dimensional bird eye view, such that the user is able to clearly recognize the information in the three-dimensional bird eye view.

In detail, when a user uses the navigation apparatus for route navigation, the most important information he/she needs to know is the road where he is located and the road he will meet in a next turn. Therefore, the navigation apparatus 100 of the example not only displays a line map associated with the navigation route, but also marks the road name of a current road and the road name associated with a next road, for example the road name of the next road when displaying the navigation route. Accordingly, the user is able to clearly recognize the road where he/she is located and the road he/she will meet in the next turn without being confused or influenced by other information in the map.

Figure 3:
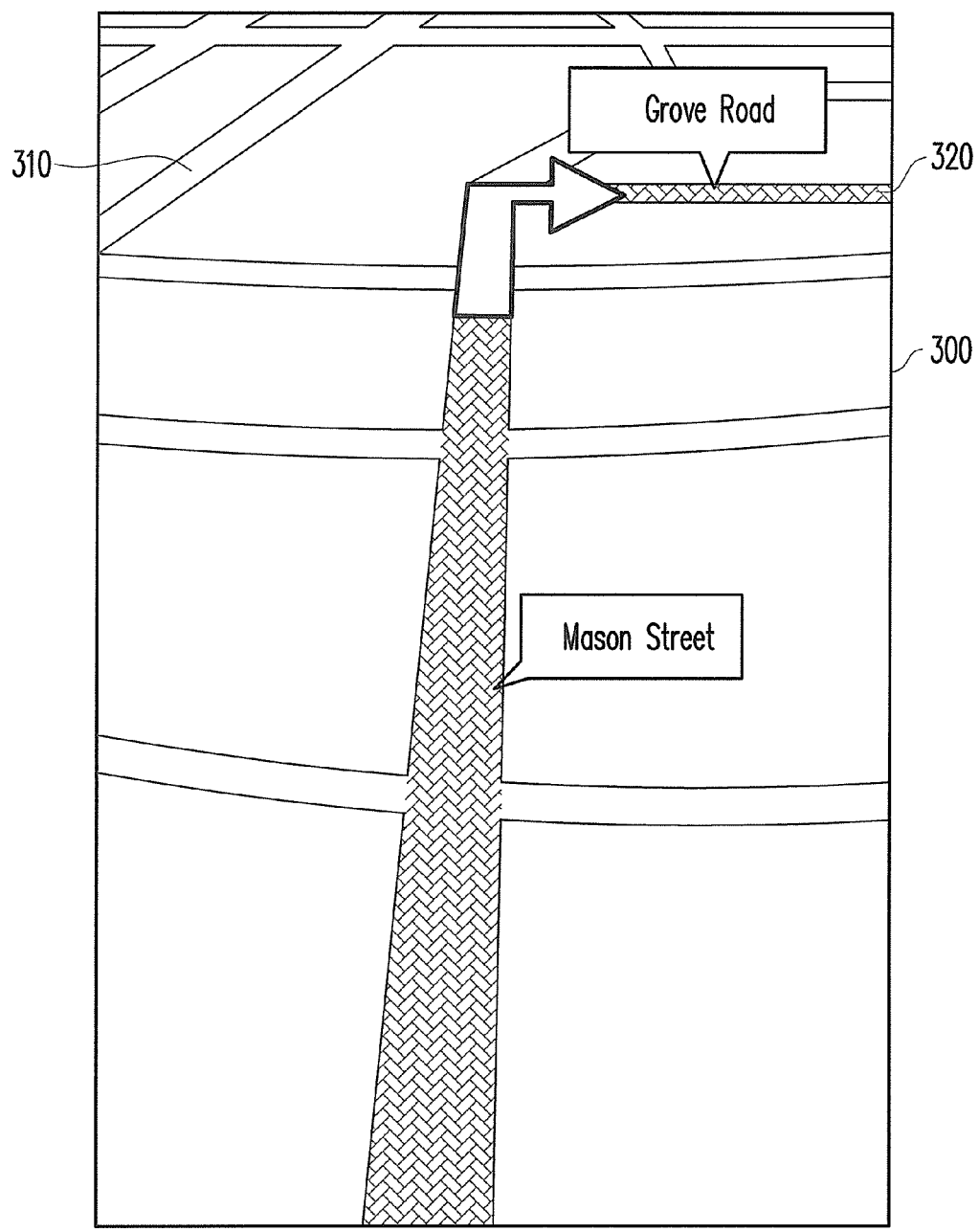
FIG. 3 is an example of a navigation map according to an example of the present application.

For example, FIG. 3 is an example of a navigation map according to an example of the present application. Referring to FIG. 3, beside the basic line map 310 and the navigation route 320 displayed in the navigation map 300, road names of the current road (e.g. Mason Street) and the next road (e.g. Grove Road) are also marked. Accordingly, the user may easily know the road where he/she is located and the road he/she will meet in a next turn from the navigation map 300, such that the situations of looking at a wrong path or missing a direction are not possible to be happened.

Through the aforesaid navigation route display method, the navigation apparatus may show the map information associated with the navigation route in a most concise form, so as to help the user to quickly know the driving path, thus reducing the probability of driving to a wrong road.

In another example, besides the road names of the current road and the next road as marked in the above example, the application may also provide other auxiliary icons associated with the navigation as the references for the user, and another example is given below for further illustration.

Figure 4:
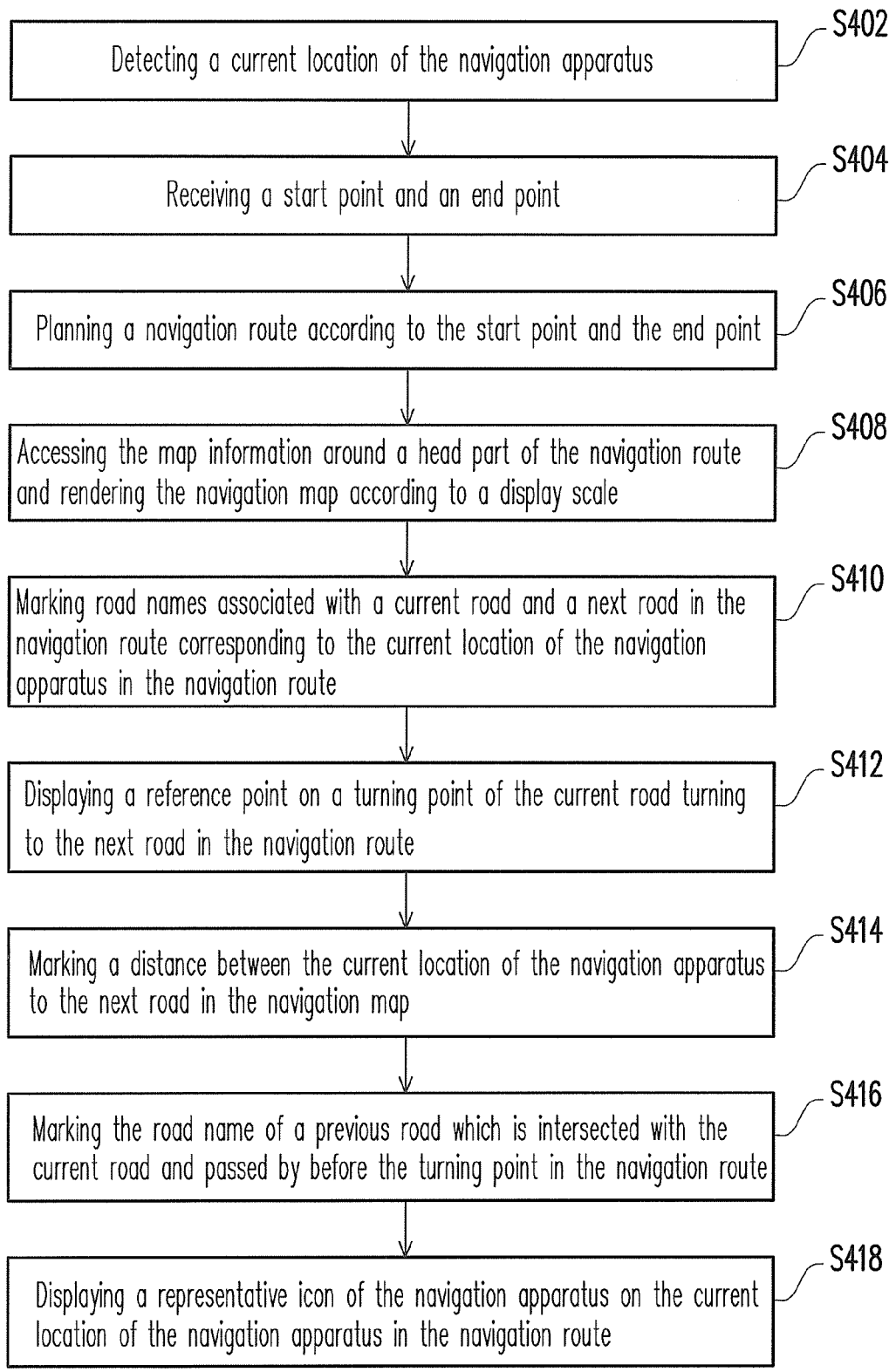
FIG. 4 is a flowchart illustrating a method for displaying a navigation route according to an example of the present application.

FIG. 4 is a flowchart illustrating a method for displaying a navigation route according to an example of the present application. Referring to FIG. 4, the method of the example is suitable for the navigation apparatus 100 in FIG. 1 and detailed steps of the navigation route display method of the application are described in detail below with reference to the aforesaid elements of the navigation apparatus 100.

First, the navigation apparatus 100 detects a current location itself by the positioning unit 110 (step S402), receives a start point and an end point by the input unit 130 (step S404), and plans the navigation route by the processing unit 150 according to the start point and the end point received by the input unit 130 (step S406).

Next, when the navigation apparatus 100 is about to display the processing unit 150 accesses the electronic map database stored in the storage unit 140 and renders a navigation map on the display unit 120 according to the data in the electronic map database, in which only the map information in the electronic map database associated with the navigation route is displayed. It is noted herein that, in the present example, the processing unit 150 may access the map information of a head part of the navigation route and render a navigation map according to a display scale defined thereby (step S408), in which the map information comprises the basic line map and the navigation route.

In addition, the processing unit 150 marks road names of a current road where the navigation apparatus 100 is located and a next road in the navigation route (step S410). The processing unit 150 also displays a reference point on a turning point of the current road turning to the next road (step S412), so as to help the user to recognize the location for making the turn, in which the reference point is, for example, a point of interest (POI), a landmark, a store, or a building located in the turning point, which is not limited herein.

In another embodiment, regarding aforesaid turning point, the processing unit 150 also marks a distance between the current location thereof and the location of the turning point (step S414), and marks the road name of a previous road which is intersected with the current road and passed by before the turning point in the navigation route (step S416), so as to help the user to prepare in advance or notice the location and timing for making the turn.

Further, the processing unit 150 also displays a representative icon of the navigation apparatus 100 on the location of the navigation apparatus 100 in the navigation route (step S418), so as to inform the user of the relative position where it is located in the navigation route. The representative icon may display a speed and forward direction information of the navigation apparatus 100, or a speed limit of the current road, so as to remind the user of paying attention.

In another example, beside aforesaid information associated with the turning point, the navigation apparatus 100 may further display road condition information. In detail, the navigation apparatus 100 may, for example, receive information of a jammed section in the navigation route by a communication unit (not shown), and then mark the jammed section on the navigation route with a preset road color or road pattern, thus offering the user to know actual road condition.

Figure 5:
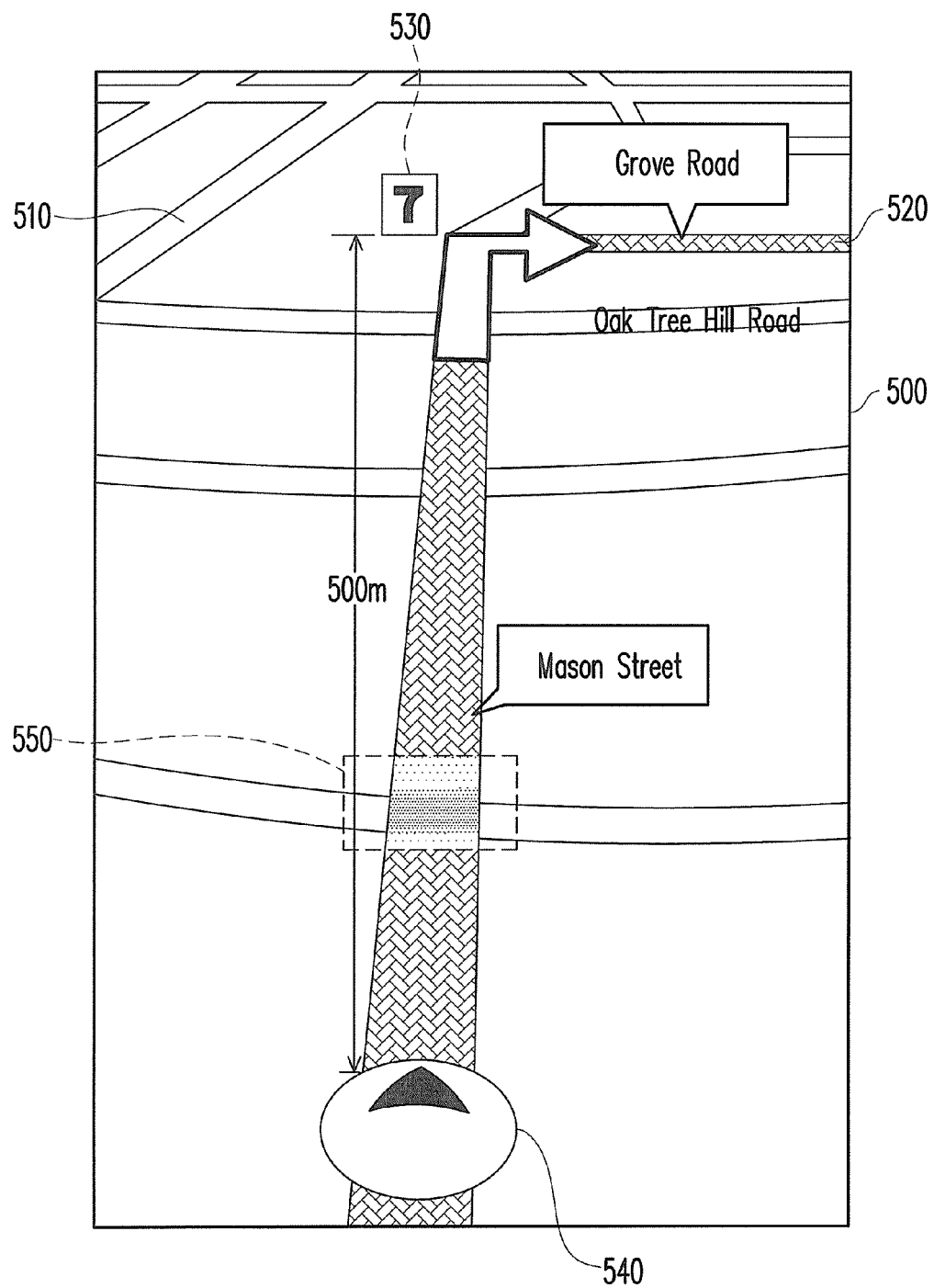
FIG. 5 is an example of a navigation map according to an example of the present application.

For example, FIG. 5 is an example of a navigation map according to an example of the present application. Referring to FIG. 5, the basic line map 510 and the navigation route 520 are displayed in the navigation map 500, the road names of the current road (e.g. Mason Street) and the next road (e.g. Grove Road) are marked in the navigation map 500, too. In addition, a reference point 530 (e.g. a store mark of a convenience store) is further displayed on a turning point of the current road turning to the next road in the navigation map 500. Regarding the turning point, a distance (e.g. 500 m) between the current location of the navigation apparatus 500 and the location of the turning point is marked in the navigation map 500, and the road name of a previous road (e.g. Oak Tree Hill Road) which will be passed by before the turning point in the navigation route is also marked in the navigation map 500. Further, a representative icon 540 of the navigation apparatus is displayed on the navigation map 500, in which forward direction information of the navigation apparatus is also displayed on the representative icon 540, so as to remind the user of paying attention. Finally, a jammed section in the navigation route is also displayed with a preset road pattern in the navigation map 500, so as to provide actual road condition.

Through aforesaid navigation route display method, the navigation apparatus may further provide necessary turning information to help the user to notice the location and timing for making a turn, thus reducing the probability of missing the turn.

It should be noted herein that, in a condition that the distance between the start point and the end point of the navigation route is farther, the navigation apparatus has to limit the display area for displaying the map, and therefore displays only the map information nearby the current location. At this time, to allow the user to know a corresponding relation between the current location and the end point, and determine the time required to reach the end point, the application also provide a thumbnail of the navigation route as a reference for the user. An example is given below for further illustration.

Figure 6:
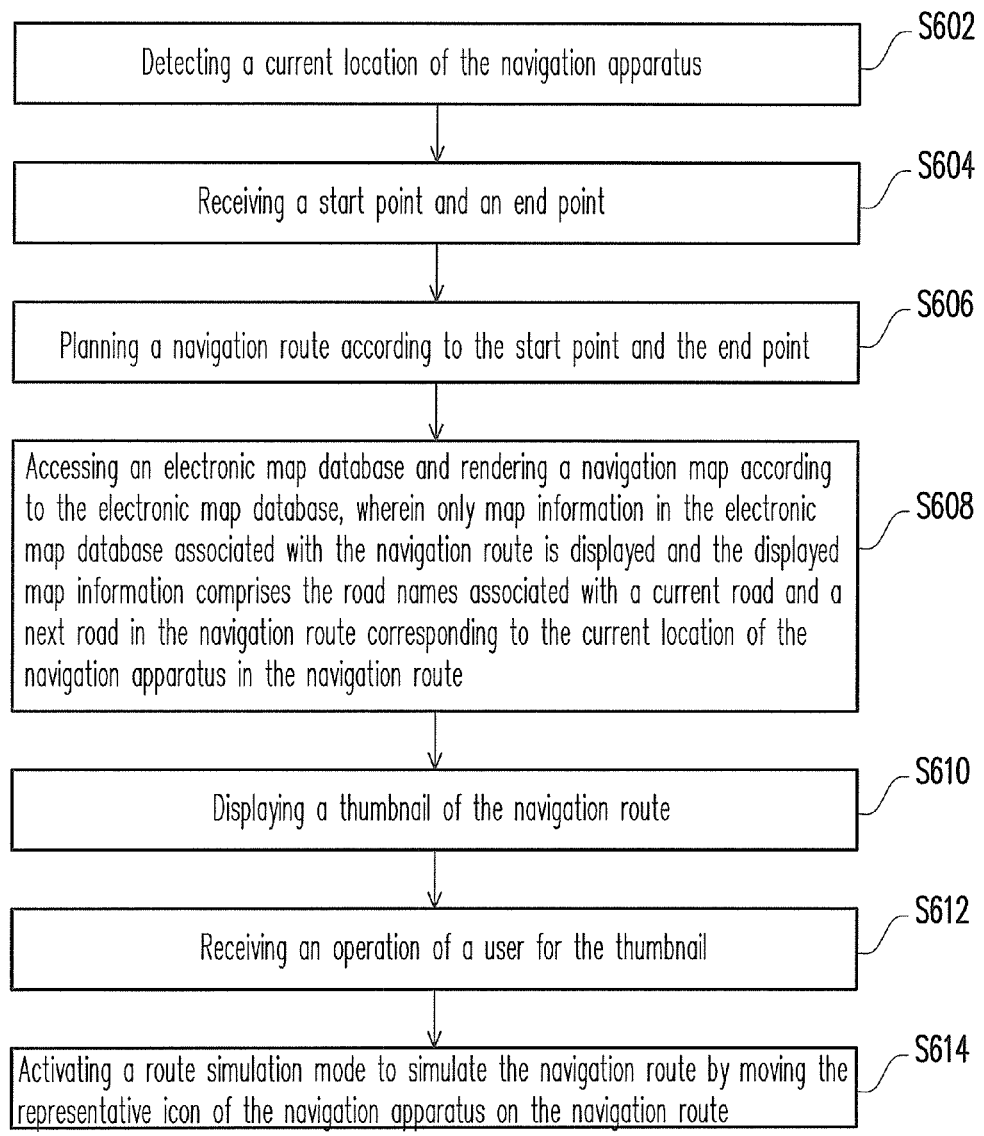
FIG. 6 is a flowchart illustrating a method for displaying a navigation route according to an example of the present application.

FIG. 6 is a flowchart illustrating a method for displaying a navigation route according to an example of the present application. Referring to FIG. 6, the method of the example is suitable for the navigation apparatus 100 in FIG. 1 and detailed steps of the navigation route display method of the application are described in detail below with reference to the aforesaid elements of the navigation apparatus 100.

First, the navigation apparatus 100 detects a current location itself by the positioning unit 110 (step S602), receives a start point and an end point by the input unit 130 (step S604), and then plans a navigation route by the processing unit 150 according to the start point and the end point received by the input unit 130 (step S606).

Next, when navigation apparatus 100 is about to display the navigation route, the processing unit 150 accesses the electronic map database stored in the storage unit 140 and renders a navigation map on the display unit 120 according to the data in the electronic map database, in which only the map information in the electronic map database associated with the navigation route is displayed, wherein the displayed map information comprises the road names associated with a current road and a next road in the navigation route corresponding to the current location of the navigation apparatus in the navigation route (step S608).

The difference between the present example and the previous example is that the processing unit 150 of the present example further displays a thumbnail of the navigation route on the display unit 120 (step S610), in which the thumbnail comprises a start point, an end point, a path of the navigation route, and a mark indicating the current location of the navigation apparatus 100 in the navigation route.

In another example, in the meantime of displaying the navigation route and the thumbnail, the navigation apparatus 100 further receives an operation of a user for the thumbnail by the input unit 130 (step S660), so as to activate a route simulation mode to simulate the navigation route by moving a representative icon of the navigation apparatus on the navigation route (step S670).

Through the aforesaid navigation route display method, the navigation apparatus may further offer the user to instantly know or inquire the corresponding relation between the current location and the end point of the navigation route before or during driving, so as to appropriately adjust the driving speed and arrive at the destination within preset time.

Figure 7:
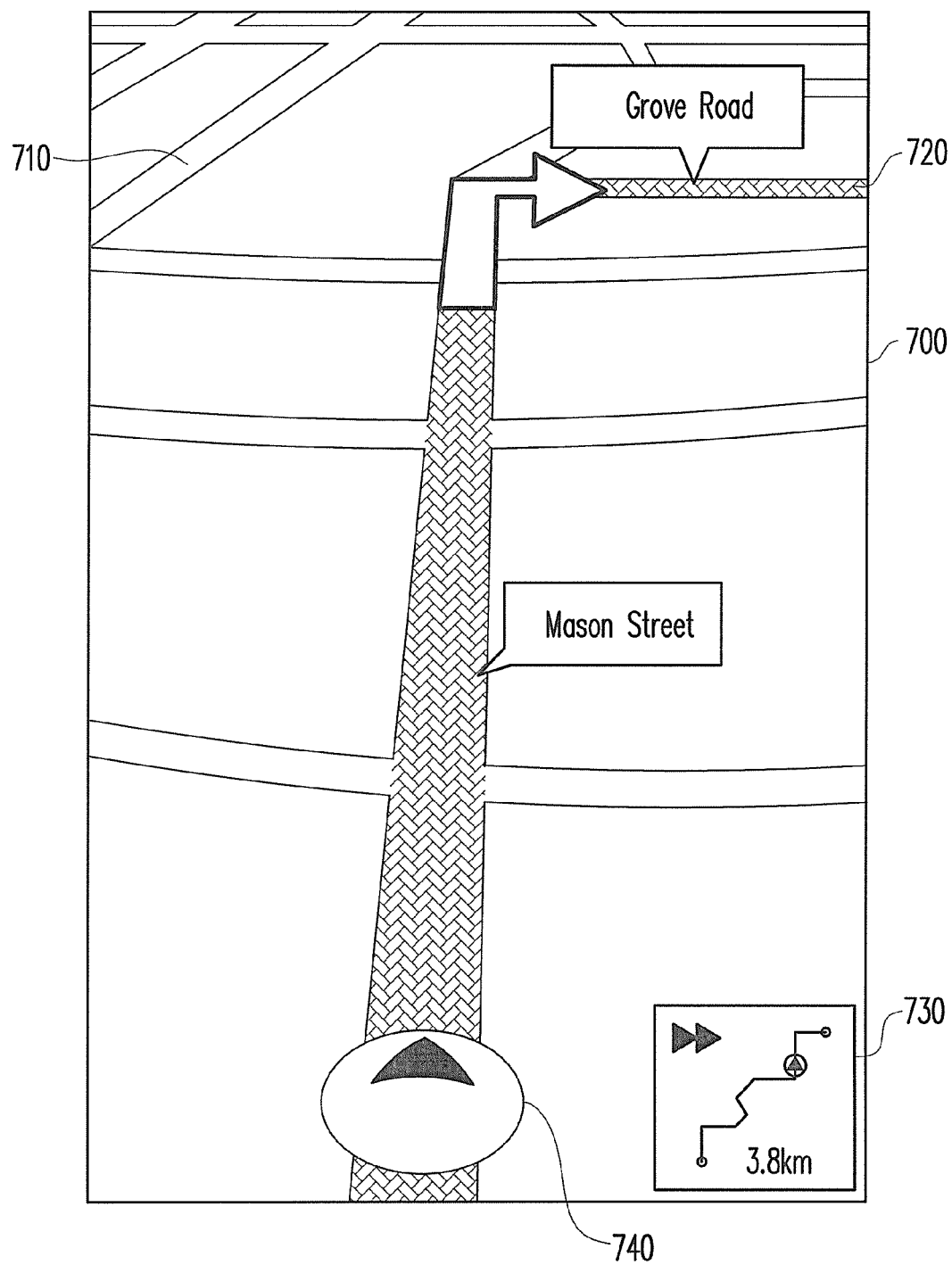
FIG. 7 is an example of a navigation map according to an example of the present application.

For example, FIG. 7 is an example of a navigation map according to an example of the present application. Referring to FIG. 7, the basic line map 710 and the navigation route 720 are displayed in the navigation map 700, the road names of the current road (e.g. Mason Street) and the next road (e.g. Grove Road) are also marked in the navigation map 700. In addition, a thumbnail 730 of the navigation route 720 is further displayed in a lower right corner of the navigation map 700. In the thumbnail 730, the navigation route 720 is rendered in simple lines, and the start point and the end point of the navigation route 720 and the current location of the navigation apparatus in the navigation route 720 are marked, thus offering the user to reference. Moreover, the thumbnail 730 itself is a touchable screen button so that once the user touches the thumbnail 730, the navigation apparatus activates the route simulation mode and simulates the navigation route 720 by moving the representative icon 320 of the navigation apparatus on the navigation route 720.

The present application further provides a recording medium which records a computer program to be loaded into a mobile device to execute the method for displaying a navigation route as described above. The computer program is composed of a plurality of program instructions (for example, an organization chart establishing program instruction, a table approving program instruction, a setting program instruction, and a deployment program instruction, etc), and these program instructions are loaded into the mobile device and executed by the same to accomplish various steps in the method for displaying a navigation route and various functions of the navigation apparatus described above.

In summary, the method for display a navigation route, the navigation apparatus, and the recording medium of the application only access necessary map info nation associated with the navigation route in the electronic map database, so as to simplify the navigation map. Accordingly, it is easier for a user to find the current location in the navigation map and notice the information of a next turn, so as to go to the destination properly.

Although the application has been described with reference to the above examples, it will be apparent to one of the ordinary skill in the art that modifications to the described example may be made without departing from the spirit of the application. Accordingly, the scope of the application will be defined by the attached claims not by the above detailed descriptions.

What is claimed is:

1. A method for displaying a navigation route, suitable for a mobile device having a screen, a positioning unit, an input unit, a storage unit and a processing unit, the method comprising:

detecting a current location of the mobile device by the positioning unit;

receiving a start point and an end point by the input unit;

planning a navigation route according to the start point and the end point by the processing unit; and accessing an electronic map database stored in the storage unit and rendering a navigation map on the screen according to the electronic map database by the processing unit, wherein only map information in the electronic map database associated with the navigation route is displayed, wherein the displayed map information in the electronic map database associated with the navigation route comprises road names associated with a current road and a next road in the navigation map corresponding to the current location of the mobile device in the navigation map, wherein the step of rendering the navigation map on the screen further comprises:

displaying a representative icon of the mobile device at the current location of the mobile device, wherein the representative icon comprises a speed and forward direction information of the mobile device or a speed limit of the current road corresponding to the current location of the mobile device;

displaying a thumbnail of the navigation route on the screen, wherein the thumbnail comprises the start point, the end point, a path of the navigation route, and a mark indicating the current location of the mobile device; and receiving an operation of a user for the thumbnail, and activating a route simulation mode to simulate the navigation route by moving the representative icon of the mobile device on the navigation route.

2. The method according to claim 1, wherein the step of rendering the navigation map on the screen further comprises:

displaying a reference point on a turning point of the current road turning to the next road in the navigation map when the current road is connected to the next road.

3. The method according to claim 1, wherein the step of rendering the navigation map on the screen further comprises:

marking a distance between the current location and a location of a next turning point in the navigation route.

4. The method according to claim 1, wherein the step of rendering the navigation map on the screen further comprises:
    marking the road name of a previous road which is intersected with the current road and passed by before the turning point in the navigation route.

5. The method according to claim 1, wherein the step of rendering the navigation map on the screen comprises:
    rendering the navigation map in a form of a two-dimensional plan view or a three-dimensional bird eye view, wherein the display scale of the three-dimensional bird eye view is larger than the display scale of the two-dimensional plan view.

6. A non-transitory recording medium, recording program instructions for:
    detecting a current location of the mobile device;
    receiving a start point and an end point;
    planning a navigation route according to the start point and the end point; and accessing an electronic map database and rendering a navigation map on the screen according to the electronic map database, wherein only map information in the electronic map database associated with the navigation route is displayed, wherein the displayed map information in the electronic map database associated with the navigation route comprises road names associated with a current road and a next road in the navigation map corresponding to the current location of the mobile device in the navigation map, wherein the step of rendering the navigation map on the screen further comprises:
        displaying a representative icon of the mobile device at the current location of the mobile device, wherein the representative icon comprises a speed and forward direction information of the mobile device or a speed limit of the current road corresponding to the current location of the mobile device;
        displaying a thumbnail of the navigation route on the screen, wherein the thumbnail comprises the start point, the end point, a path of the navigation route, and a mark indicating the current location of the mobile device; and
        receiving an operation of a user for the thumbnail, and activating a route simulation mode to simulate the navigation route by moving the representative icon of the mobile device on the navigation route.

7. A navigation apparatus, comprising:
    a positioning unit, for detecting a current location of the navigation apparatus;
    a display unit;
    an input unit, for receiving a start point and an end point;
    a storage unit, for storing an electronic map database; and
    a processing unit, coupled to the positioning unit, the input unit, the display unit and a storage unit, for planning a navigation route according to the start point and the end point received by the input unit, accessing the electronic map database stored in the storage unit, and rendering a navigation map on the display unit according to the electronic map database, wherein only map information in the electronic map database associated with the navigation route is displayed, wherein the displayed map information in the electronic map database associated with the navigation route comprises road names associated with a current road and a next road in the navigation map corresponding to the current location of the navigation apparatus in the navigation map, wherein the processing unit further comprises:
        displaying a representative icon at the current location of the navigation apparatus, wherein the representative icon comprises a speed and forward direction information of the navigation apparatus or a speed limit of the current road corresponding to the current location of the navigation apparatus; and
        displaying a thumbnail of the navigation route on the display unit, wherein the thumbnail comprises the start point, the end point, a path of the navigation route, and a mark indicating the current location of the navigation apparatus; and
        receiving an operation of a user for the thumbnail, and activating a route simulation mode to simulate the navigation route by moving the representative icon of the mobile device on the navigation route.

8. The navigation apparatus according to claim 7, wherein the processing unit further displays a reference point on a turning point of the current road turning to the next road in the navigation map.

9. The navigation apparatus according to claim 7, wherein the processing unit further marks a distance between the current location and a location of a next turning point in the navigation route.

10. The navigation apparatus according to claim 8, wherein the reference point comprises a point of interest, a landmark, a store, or a building located in the turning point.

11. The navigation apparatus according to claim 7, wherein the processing unit further marks the road name of a previous road which is intersected with the current road and passed by before the turning point in the navigation route.

12. The navigation apparatus according to claim 7, further comprising:
    a communication unit, for receiving information of a jammed section in the navigation route, wherein the processing unit marks the jammed section on the navigation route displayed by the display unit by using a preset road color or road pattern.

13. The navigation apparatus according to claim 7, wherein the processing unit comprises:
    rendering the navigation map in a form of a two-dimensional plan view or a three-dimensional bird eye view.

* * * * *